US010235579B2

(12) United States Patent
Park et al.

(10) Patent No.: US 10,235,579 B2
(45) Date of Patent: Mar. 19, 2019

(54) VANISHING POINT CORRECTION APPARATUS AND METHOD

(71) Applicant: PLK Technologies Co., Ltd., Seoul (KR)

(72) Inventors: Kwang Il Park, Seoul (KR); Sang Mook Lim, Seoul (KR); Jin Hyuck Kim, Seoul (KR)

(73) Assignee: PLK Technologies Co., Ltd., Seoul (KR)

( * ) Notice: Subject to any disclaimer, the term of this patent is extended or adjusted under 35 U.S.C. 154(b) by 68 days.

(21) Appl. No.: 15/560,296

(22) PCT Filed: Apr. 14, 2016

(86) PCT No.: PCT/KR2016/003878
§ 371 (c)(1),
(2) Date: Sep. 21, 2017

(87) PCT Pub. No.: WO2016/190544
PCT Pub. Date: Dec. 1, 2016

(65) Prior Publication Data
US 2018/0060679 A1      Mar. 1, 2018

(30) Foreign Application Priority Data

May 26, 2015   (KR) .................... 10-2015-0072669

(51) Int. Cl.
*G06K 9/00* (2006.01)
*G08G 1/16* (2006.01)
(Continued)

(52) U.S. Cl.
CPC ..... *G06K 9/00805* (2013.01); *G06K 9/00798* (2013.01); *G06K 9/32* (2013.01);
(Continued)

(58) Field of Classification Search
CPC ................. G08G 1/167; G06T 2207/30261
See application file for complete search history.

(56) References Cited

U.S. PATENT DOCUMENTS 5,638,116 A  *  6/1997 Shimoura ............ G05D 1/0246
348/118
2002/0031242 A1 *  3/2002 Yasui .................. G05D 1/0246
382/104
(Continued)

FOREIGN PATENT DOCUMENTS

JP      2002-232874 A      8/2002
JP      2002-327635 A     11/2002
(Continued)

*Primary Examiner* — Oneal R Mistry
(74) *Attorney, Agent, or Firm* — Rabin & Berdo, P.C.

(57) ABSTRACT

A vanishing point correction method may include the steps of: (a) extracting a contour candidate point of an object considered as the forward vehicle from the image taken by the camera; (b) tracking a movement of the contour candidate point over time; (c) determining whether the contour candidate point belongs to the vehicle; (d) setting the contour candidate point to a vehicle contour point of the forward vehicle, when it is determined at the step (c) that the contour candidate point belongs to the vehicle; (e) calculating a variation in width between vehicle contour points at the same height among the vehicle contour points; and (f) calculating a variation of the vanishing point.

9 Claims, 6 Drawing Sheets

(51) Int. Cl.
  *G06T 7/62* (2017.01)
  *G06T 7/246* (2017.01)
  *G06K 9/32* (2006.01)
  *G06K 9/46* (2006.01)
  *G06K 9/50* (2006.01)

(52) U.S. Cl.
  CPC ......... *G06K 9/3241* (2013.01); *G06K 9/4604* (2013.01); *G06K 9/4642* (2013.01); *G06K 9/50* (2013.01); *G06T 7/246* (2017.01); *G06T 7/62* (2017.01); *G08G 1/16* (2013.01); *G08G 1/166* (2013.01); *G08G 1/167* (2013.01); *G06K 2009/3291* (2013.01); *G06T 2207/30261* (2013.01)

(56) References Cited

U.S. PATENT DOCUMENTS

2010/0322476 A1* 12/2010 Kanhere .............. G08G 1/0175
  382/103
2015/0103174 A1* 4/2015 Emura ...................... B60R 1/00
  348/148

FOREIGN PATENT DOCUMENTS

| KR | 10-2007-0115100 A | 12/2007 |
| KR | 10-0979726 B1 | 9/2010 |
| KR | 10-1257871 B1 | 4/2013 |
| KR | 10-2015-0051425 A | 5/2015 |

\* cited by examiner

VANISHING POINT CORRECTION APPARATUS AND METHOD

TECHNICAL FIELD

The present disclosure relates to an apparatus and method for correcting a vanishing point in an image recognition system of a vehicle, and more particularly, to a vanishing point correction apparatus and method which can precisely correct a variation of a vanishing point, and prevent a false alarm of an ADAS (Advanced Driver Assistance System) such as an FCWS (Forward Collision Warning System) or LDWS (Lane Departure Warning System.

BACKGROUND ART

In general, an image recognition system for lane recognition is mounted in an ADAS (Advanced Driver Assistance System) such as an FCWS (Forward Collision Warning System), LDWS (Lane Departure Warning System) or LKAS (Lane Keeping Assistant System).

The lane recognition requires a process of acquiring an image of a target object through a camera, extracting the features of the target object through a digital image processing technique, and checking the target object using the features. At this time, a vanishing point at which two lanes at both sides of a vehicle meet each other serves as very important information for correctly extracting the lane feature.

The vanishing point is varied by a pitch motion of the vehicle or a bend in the road. When the vanishing point is varied, an error may occur in lane recognition information or object acquisition information. Such an error needs to be corrected. Korean Patent Registration No. 10-1257871 discloses a technique that acquires a plurality of images with time differences through a camera, minimizes an error caused by a pitch motion based on a vanishing point and optical flow when the pitch motion occurred, and detects an object. The technique disclosed in this patent document does not directly correct the vanishing point, but reduces an error by minimizing an influence of the pitch motion. However, a variation of the vanishing point needs to be checked, in order to more accurately detect an object.

FIG. 1 illustrates that a vanishing point is varied in a conventional FCWS. In FIG. 1, an image taken by a camera while a vehicle travels on the road 10 shows a forward situation. When a forward vehicle 12 is present in the image, the forward vehicle 12 may be detected through the following process. First, the FCWS acquires a forward image through the camera, and performs inverse filtering on the acquired image in order to distinguish the forward vehicle 12 from other objects. Then, the FCWS recognizes the shape of the forward vehicle 12, and determines whether the forward vehicle 12 is a vehicle. When it is determined that the forward vehicle 12 is a vehicle, the FCWS recognizes the bottom of a rear wheel or the end of a lower shadow area of the forward vehicle 12 as a distance reference point, and calculates a relative distance to the forward vehicle 12 based on the distance reference point.

The relative distance may be obtained through Equation 1 below.

$$Z = \lambda \frac{h}{y} \qquad \text{[Equation 1]}$$

In Equation 1, Z represents the relative distance between an ego vehicle and the forward vehicle, λ represents a focal distance of the camera, h represents the height of the camera, and y represents the height of the distance reference point on the camera.

When the relative distance calculation is repeated in successive images, a relative velocity may be calculated through Equation 2 below.

$$v = \frac{Z_{t+\Delta t} - Z_t}{\Delta t} \qquad \text{[Equation 2]}$$

In Equation 2, v represents the relative velocity of the ego vehicle with respect to the forward vehicle, $Z_t$ represents a relative distance at time t, and $Z_{t+\Delta t}$ represents a variation of the relative distance depending on a time variation $\Delta t$. Furthermore, a time to collision (TTC) may be calculated from a value obtained by dividing the relative distance by the relative velocity, and the FCWS warns of a collision risk when the TTC is less than a threshold value as expressed by Equation 3 below.

$$TTC = \frac{Z}{v} < TTC_{threshold} \qquad \text{[Equation 3]}$$

In Equation 3, TTC represents a time to collision, and $TTC_{threshold}$ represents the threshold value of the TTC.

In Equation 1, y represents a height based on the vanishing point P, and the vanishing point is varied by a pitch motion of the vehicle or a bend in the road. When the vanishing point is varied from P to M as illustrated in FIG. 1, the relative distance must be corrected as expressed by Equation 4 in consideration of the variation of the vanishing point.

$$Z = \lambda \frac{h}{y - y_m} \qquad \text{[Equation 4]}$$

In Equation 4, $y_m$ represents a y-axis variation of the vanishing point.

When the variation of the vanishing point is not detected, the FCWS may generate a collision warning even though the forward vehicle is sufficiently separated from the ego vehicle, or may not generate a collision warning even though the forward vehicle is close to the ego vehicle.

RELATED ART

Patent Document (Patent Document 1) Korean Patent Registration No. 10-1257871

DISCLOSURE

Technical Problem

Various embodiments are directed to a vanishing point correction apparatus and method which can extract contour points of a forward vehicle, decide contour points having the same height by tracking movements of the contour points, track a variation in vanishing point from a width variation between the contour points, and detect and correct an instant variation of the vanishing point, thereby preventing a false warning in an ADAS such as FCWS.

Technical Solution

In an embodiment, there is provided a vanishing point correction method that corrects the position of a vanishing point in an image taken by a camera in an image recognition system mounted in a vehicle. The vanishing point correction method may include the steps of: (a) extracting a contour candidate point of an object considered as the forward vehicle from the image taken by the camera; (b) tracking a movement of the contour candidate point over time; (c) determining whether the contour candidate point belongs to the vehicle; (d) setting the contour candidate point to a vehicle contour point of the forward vehicle, when it is determined at the step (c) that the contour candidate point belongs to the vehicle; (e) calculating a variation in width between vehicle contour points at the same height among the vehicle contour points; and (f) calculating a variation of the vanishing point through Equation 13 below:

$$y_{m2} = y_2 - \frac{w_2}{w_1}(y_1 - y_{m1}), \quad \text{Equation 13}$$

where $y_1$ and $y_2$ represent the heights of the vehicle contour point in images taken by the camera at times t1 and t2, $w_1$ and $w_2$ represent the widths between the vehicle contour points at times t1 and t2, $y_{m1}$ and $y_{m2}$ represent the heights of the vanishing point at times t1 and t2, and the time t2 indicates a predetermined passage of time from the time t1.

The step (a) comprises extracting a point at which a horizontal edge and a vertical edges cross each other in the image taken by the camera, as the contour candidate point.

The step (b) comprises the steps of: (b-1) defining a first block having a plurality of pixels around the contour candidate point in a first image; (b-2) defining a second block having the same size as the first block in a second image after a predetermined passage of time from the first image; (b-3) determining whether a pixel value of the second block coincides with a pixel value of the first block, while moving the second block to around the contour candidate point based on the same position as the first block in the second image; and (b-4) determining that the contour candidate point has moved in the corresponding block, when it is determined at the step (b-3) that the pixel value of the second block coincides with the pixel value of the first block.

The step (c) comprises the steps of: (c-1) extracting the bottom of a rear wheel or the end of a lower shadow area of the forward vehicle, and recognizing the bottom of the rear wheel or the end of the lower shadow area as a distance reference point; (c-2) subtracting a relative distance to the distance reference point from a relative distance to the contour candidate point through Equation 6 below; (c-3) determining whether the subtraction result of the step (c-2) is constant over time within a predetermined error range; and (c-4) determining that the corresponding contour candidate point belongs to the vehicle, when it is determined at the step (c-2) that the subtraction result of the step (c-2) is not constant over time:

$$Zc0 - Z0 = \lambda \frac{h}{yc0} - \lambda \frac{h}{y0}, \quad \text{Equation 6}$$

where Zc0 represents the relative distance to the contour candidate point, Z0 represents the relative distance to the distance reference point, yc0 represents the height of the contour candidate point in the image taken by the camera, and y0 represents the height of the distance reference point in the image taken by the camera.

The step (c) comprises the steps of: (c-1) extracting the bottom of a rear wheel or the end of a lower shadow area of the forward vehicle, and recognizing the bottom of the rear wheel or the end of the lower shadow area as a distance reference point; (c-2) calculating a height of the contour candidate point relative to the distance reference point through Equation 7 below; (c-3) determining whether the calculation result of the step (c-2) is constant over time within a predetermined error range; and (c-4) determining that the corresponding contour candidate point belongs to the vehicle, when it is determined at the step (c-3) that the calculation result of the step (c-2) is constant over time:

$$Yc0 = h\left(1 - \frac{yc0}{y0}\right), \quad \text{Equation 7}$$

where Yc0 represents the height of the contour candidate point, yc0 represents a height of the contour candidate point in the image taken by the camera, and y0 represents a height of the distance reference point in the image taken by the camera.

In another embodiment, a vanishing point correction apparatus that is mounted in a vehicle and corrects the position of a vanishing point in an image taken by a camera, the vanishing point correction apparatus comprises: a contour candidate point extraction unit configured to extract a contour candidate point of an object considered as a forward vehicle from the image taken by the camera; a contour point determination unit configured to track a movement of the contour candidate point, determine whether the contour candidate point belongs to the vehicle, and set the contour candidate point to a vehicle contour point when the contour candidate point belongs to the vehicle; a contour point variation calculation unit configured to calculate a variation in width between vehicle contour points at the same height among the vehicle contour points; and a vanishing point correction unit configured to calculate a vanishing point variation from the width variation calculated through the contour point variation calculation unit, using Equation 13 below:

$$y_{m2} = y_2 - \frac{w_2}{w_1}(y_1 - y_{m1}), \quad \text{Equation 13}$$

where $y_1$ and $y_2$ represent heights of the vehicle contour point in images taken by the camera at times t1 and t2, $w_1$ and $w_2$ represent the widths between the vehicle contour points at times t1 and t2, $y_{m1}$ and $y_{m2}$ represent the heights of the vanishing point at times t1 and t2, and the time t2 indicates a predetermined passage of time from the time t1.

The contour candidate point extraction unit extracts a point at which a horizontal edge and a vertical edge cross each other in the image taken by the camera, as the contour candidate point.

The contour point determination unit comprises a relative distance tracking unit configured to extract the bottom of a rear wheel or the end of a lower shadow area of the forward vehicle, recognize the bottom of the rear wheel or the end of the lower shadow area as a distance reference point, determine whether a result obtained by subtracting a relative distance to the distance reference point from a relative distance to the contour candidate point through Equation 6 below is constant over time, and determine that the corresponding contour candidate point belongs to the vehicle, when the subtraction result is not constant over time:

$$Zc0 - Z0 = \lambda \frac{h}{yc0} - \lambda \frac{h}{y0},\qquad \text{Equation 6}$$

where Zc0 represents the relative distance to the contour candidate point, Z0 represents the relative distance to the distance reference point, yc0 represents a height of the contour candidate point in the image taken by the camera, and y0 represents a height of the distance reference point in the image taken by the camera.

The contour point determination unit comprises a height tracking unit configured to extract the bottom of a rear wheel or the end of a lower shadow area of the forward vehicle, recognize the bottom of the rear wheel or the end of the lower shadow area as the distance reference point, determine whether a height of the contour candidate point relative to the distance reference point through Equation 7 below is constant over time, and determine that the contour candidate point belongs to the vehicle, when the height of the contour candidate point is constant over time:

$$Yc0 = h\left(1 - \frac{yc0}{y0}\right),\qquad \text{Equation 7}$$

where Yc0 represents the height of the contour candidate point, yc0 represents the height of the contour candidate point in the image taken by the camera, and y0 represents a height of the distance reference point in the image taken by the camera.

Advantageous Effects

In accordance with the present embodiments, the vanishing point correction apparatus and method can track contour points of a forward vehicle, determine whether the contour points belong to a vehicle, calculate a vanishing point variation from a variation in width between contour points having the same height, acquire the vanishing point variation information in real time when the forward vehicle is present in an image taken by the camera, prevent a false warning in an ADAS such as FCWS, and provide correct information to a driver.

MODE FOR INVENTION

Figure 1:
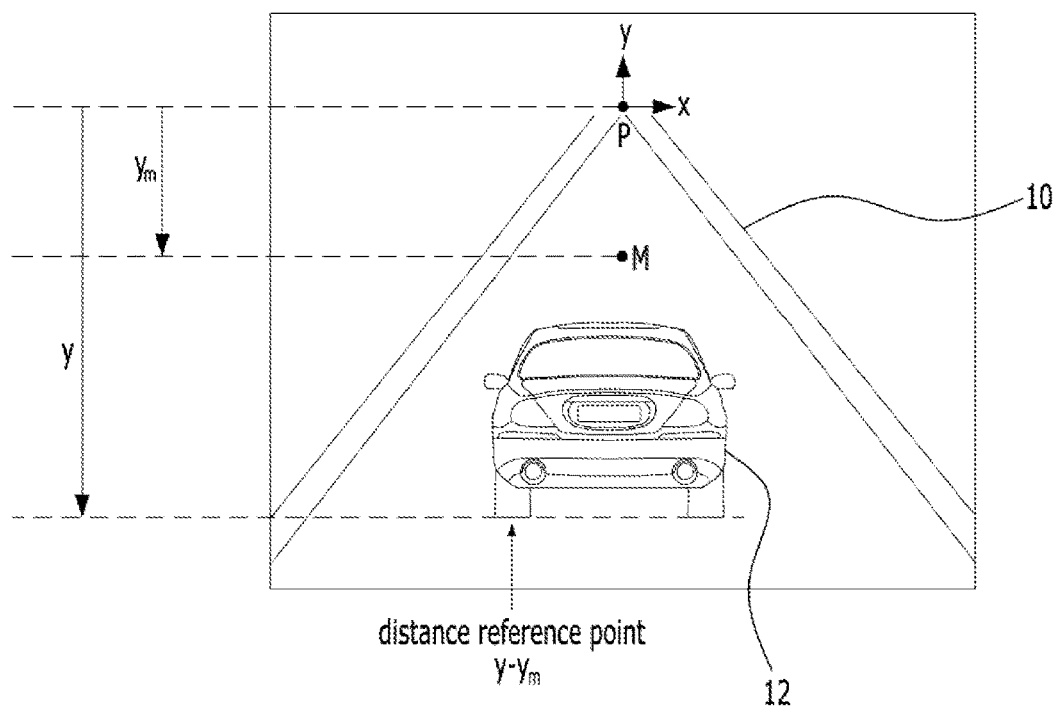
FIG. 1 illustrates that a vanishing point is varied in a forward collision warning system.

Hereafter, exemplary embodiments of the present invention will be described with reference to the accompanying drawings. However, the present invention is not limited to specific embodiments, and may include all variations, equivalents and substitutes within the scope of the present invention.

Throughout the specification, the same components are represented by like reference numerals. The accompanying drawings of this specification are for convenience of descriptions, and the shapes and relative scales thereof may be exaggerated or omitted.

When the embodiments are described in detail, the duplicated descriptions or the descriptions of techniques publicly known to those skilled in the art are omitted herein. In the following descriptions, when an element is referred to as "including" another element, the element may further include other elements unless referred to the contrary.

The terms "~unit", "~er" and "~module" described in the specification may indicate a unit for processing one or more functions or operations, and the unit can be embodied by hardware, software or a combination of hardware and software. Furthermore, when an element is referred to as being electrically connected to another element, it may not only indicate that the former element is directly connected to the latter element, but also indicate that the former element is connected to the latter element with another element interposed therebetween.

Figure 2:
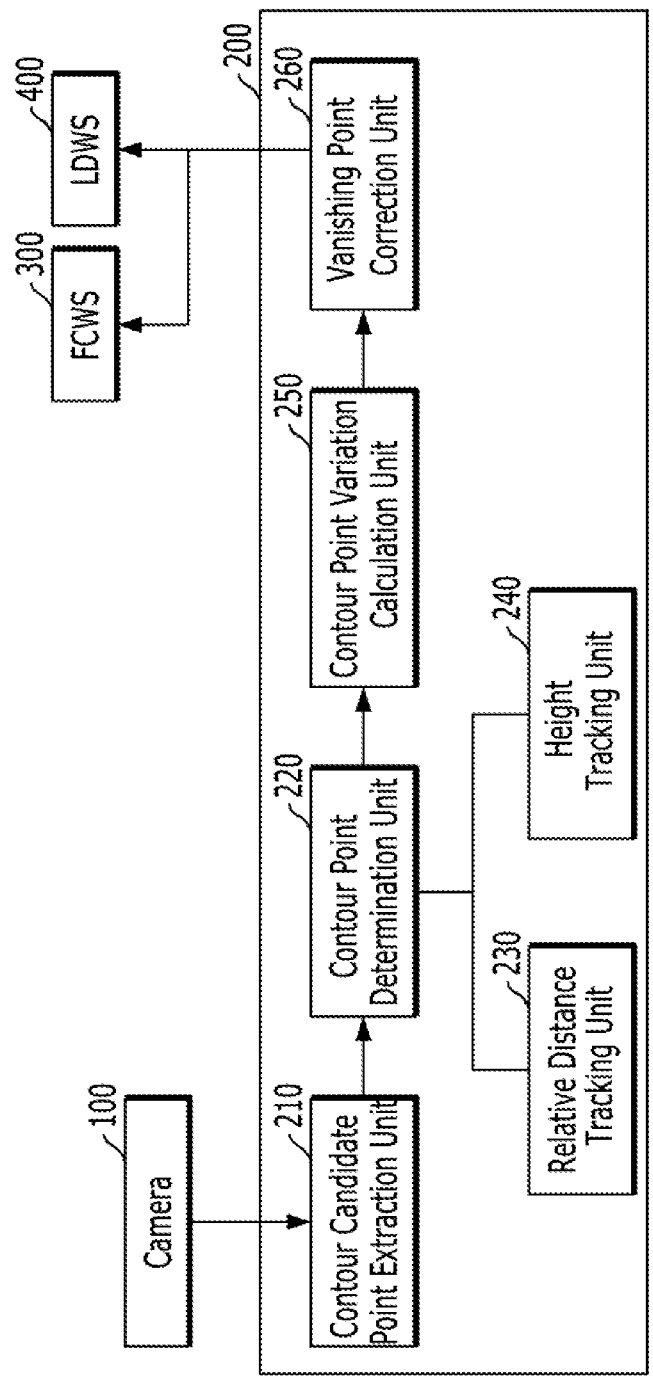
FIG. 2 is a block diagram illustrating a vanishing point correction apparatus in accordance with an embodiment of the present invention.

FIG. 2 is a block diagram illustrating a vanishing point correction apparatus in accordance with an embodiment of the present invention. Referring to FIG. 2, the vanishing point correction apparatus includes an image processor 200 for processing an image taken by a camera 100, and a vanishing point correction value outputted by the image processor 200 is transmitted to an ADAS (Advanced Driver Assistance system) such as an FCWS (Forward Collision Warning System) 300, LDWS (Lane Departure Warning System) 400 or LKAS (Lane Keeping Assistant System). For example, the vanishing point correction apparatus may be included in the listed ADAS or another ADAS which is not listed, or configured as a separate apparatus to transmit the vanishing point correction value to the ADAS.

As illustrated in FIG. 2, the image processor 200 includes a contour candidate point extraction unit 210, a contour point determination unit 220, a relative distance tracking unit 230, a height tracking unit 240, a contour point variation calculation unit 250 and a vanishing point correction unit 260.

Figure 4:
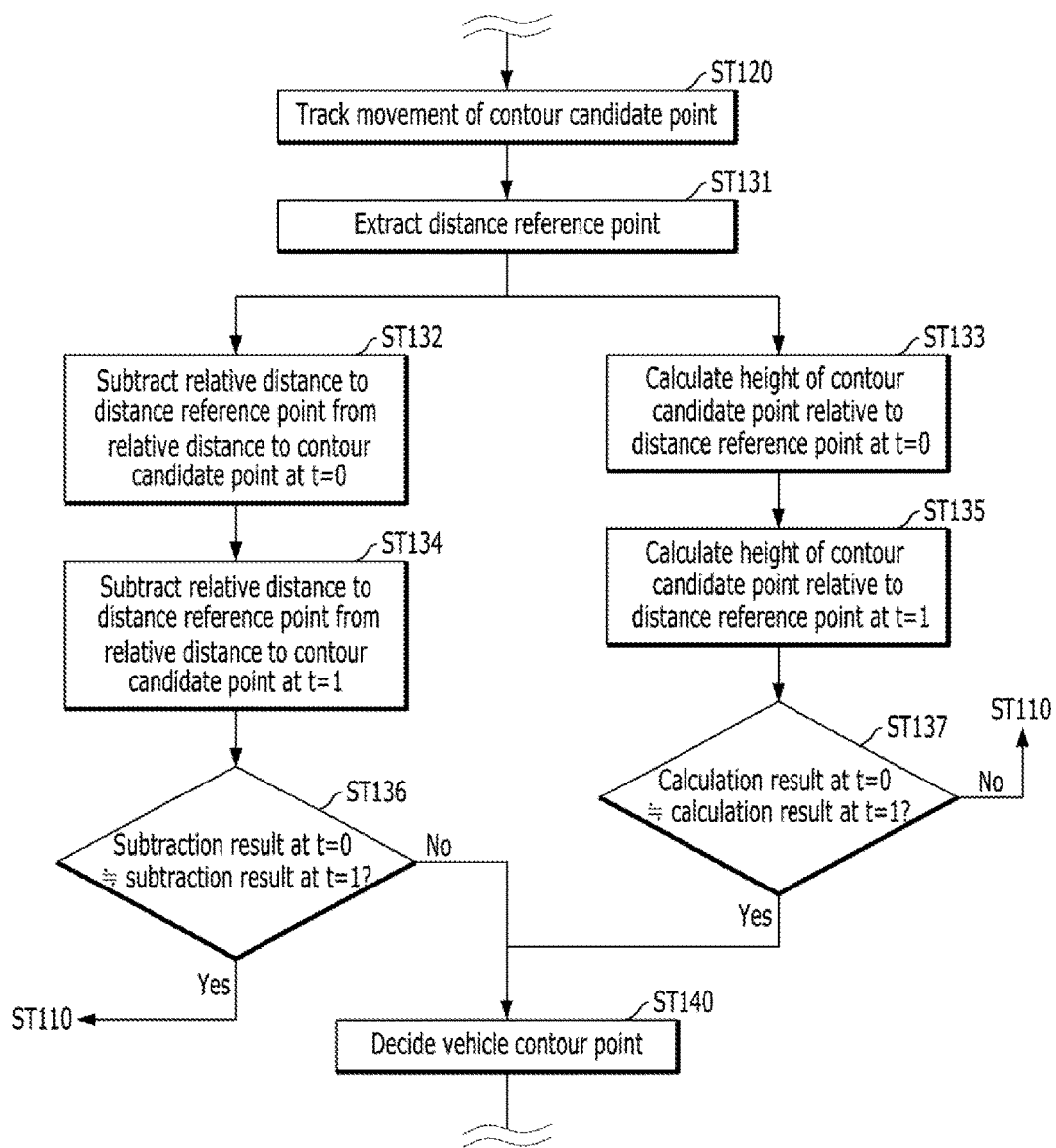
FIG. 4 is a flowchart illustrating a process of determining whether a contour candidate point belongs to a vehicle.

The contour candidate point extraction unit 210 extracts contour candidate points of an object considered as a forward vehicle from an image taken by the camera 100. The contour point determination unit 220 determines whether the contour candidate points extracted by the contour candidate point extraction unit 210 belong to the vehicle. As illustrated in FIG. 4, the contour point determination unit 220 includes the relative distance tracking unit 230 and the height tracking unit 240.

The contour point variation calculation unit 250 calculates a width variation between vehicle contour points at the same height among the vehicle contour points set by the contour point determination unit 220. The vanishing point correction unit 260 calculates a vanishing point variation using the width variation between the vehicle contour points.

Figure 3:
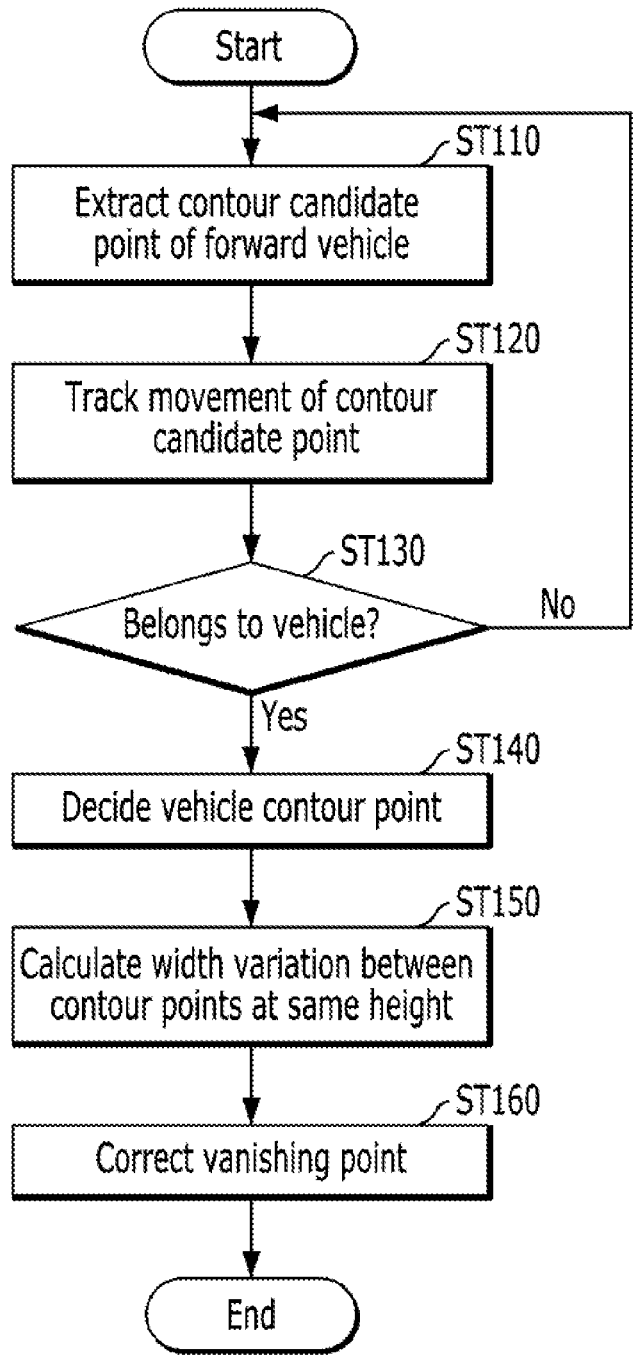
FIG. 3 is a flowchart illustrating a vanishing point correction method in accordance with an embodiment of the present invention.

FIG. 3 is a flowchart illustrating a vanishing point correction method in accordance with an embodiment of the present invention, and FIG. 4 is a flowchart illustrating a process of determining whether a contour candidate point belongs to a vehicle. Referring to FIGS. 3 and 4, the operation relations of the respective units and the vanishing point correction method in accordance with the present embodiment will be described in more detail as follows.

First, the contour candidate point extraction unit 210 of the image processor 200 receives image information from the camera 100, and extracts a contour candidate point of an object considered as a forward vehicle, at step ST110. For example, the contour candidate point extraction unit 210 extracts a point at which a horizontal edge and a vertical edge crosses each other in the image taken by the camera 100, as the contour candidate point.

Figure 5:
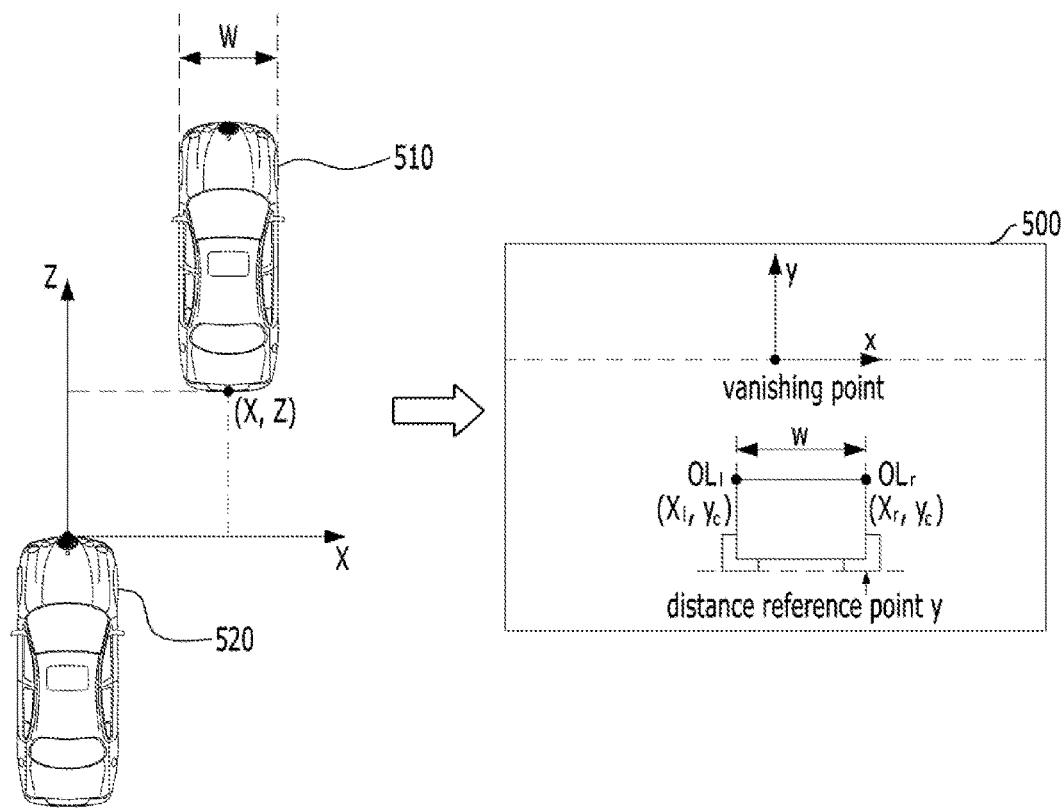
FIG. 5 illustrates a process of extracting a contour candidate point.

FIG. 5 illustrates the process of extracting a contour candidate point in accordance with the present embodiment. The example of FIG. 5 is based on the supposition that the position of a forward vehicle 510 relative to an ego vehicle 520 based on a coordinate axis can be represented by a coordinate (X, Z), and the width of the forward vehicle 510 is represented by 'W'.

As illustrated in the right side of FIG. 5, a left contour candidate point and a right contour candidate point between contour candidate points of the forward vehicle 510 based on a vanishing point P on an image 500 taken by the camera 100 may be represented by $OL_l$ and $OL_r$, respectively. In this case, the coordinate of the contour candidate point $O_l$ is $(x_l, y_c)$, and the coordinate of the contour candidate point $OL_r$ is $(x_r, y_c)$. At this time, a width 'w' between the two contour candidate points $OL_l$ and $OL_r$ on the image 500 may be expressed as Equation 5 below, according to a formula of a lens considering the vanishing point.

$$w = |x_l - x_r| = \frac{\lambda}{Z}|X_l - X_r| = \lambda \frac{W}{Z} \quad \text{[Equation 5]}$$

In Equation 5, Z represents a relative distance between the ego vehicle and the forward vehicle, and λ represents the focal distance of the camera.

That is, the width between the two contour candidate points $OL_l$ and $OL_r$ on the image 500 is proportional to the width of the forward vehicle 510 on the coordinate axis, and inversely proportional to the relative distance between the forward vehicle 510 and the ego vehicle 520.

Then, the contour point determination unit 220 tracks a movement of the contour candidate point at step ST120. For example, the contour point determination unit 220 defines a first block including a plurality of pixels around the contour candidate point in a first image from which the contour candidate point was extracted. Then, the contour point determination unit 220 defines a second block having the same size as the first block in a second image acquired after a predetermined time. While moving the second block of the second image to around the contour candidate point based on the same position as the first block, the contour point determination unit 220 determines whether a pixel value of the second block coincides with a pixel value of the first block. For example, the contour point determination unit 220 may move the second block of the second image along a whirlwind shape. When the pixel value of the second block coincides with the pixel block of the first block, the contour point determination unit 220 determines that the contour candidate point has moved in the corresponding block.

Then, the contour point determination unit 220 determines whether the contour candidate point belongs to the vehicle, at step ST130. The process of determining whether the contour candidate point belongs to the vehicle may be performed through the following two methods or any one of the following two methods.

The first method is to track the relative distance of the contour candidate point through the relative distance tracking unit 230, and the second method is to track the height of the contour candidate point through the height tracking unit 240.

Figure 6:
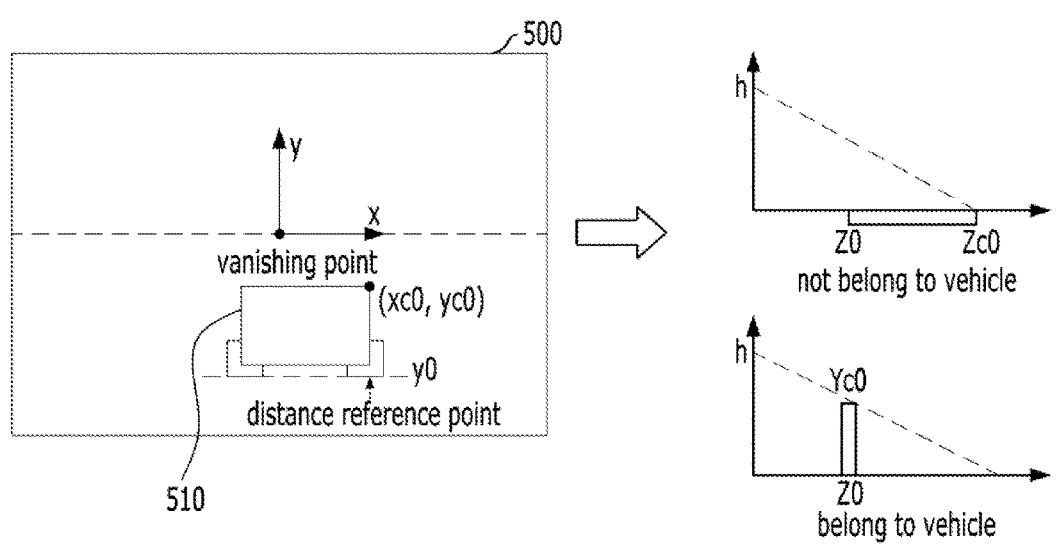
FIG. 6 illustrates an example of the process of determining whether a contour candidate point belongs to the vehicle.

FIG. 6 illustrates an example of the process of determining whether a contour candidate point belongs to the vehicle. Referring to FIG. 6, the process of determining whether a contour candidate point belongs to the vehicle will be described as follows. FIG. 6 illustrates a process of determining whether one contour candidate point belongs to the vehicle, and the determination process is equally applied to other contour candidate points.

Referring to the left side of FIG. 6, the coordinate of a contour candidate point on the image 500 may be assumed to be (xc0, yc0). The y-axis coordinate value of the distance reference point corresponding to the bottom of a rear wheel or the end of a lower shadow area of the forward vehicle 510 is represented by y0.

When the contour candidate point (xc0, yc0) of FIG. 6 does not belong to the vehicle, the contour candidate point is projected onto a point Zc0 on the road by the camera 100 as illustrated in the right top graph of FIG. 6. When the Z-axis coordinate value of the distance reference point on the actual coordinate axis is represented by Z0, an object on the road has a length corresponding to a subtraction of Z0 from Zc0, and the length may be expressed as Equation 6 below.

$$Zc0 - Z0 = \lambda \frac{h}{yc0} - \lambda \frac{h}{y0} \quad \text{[Equation 6]}$$

In Equation 6, Zc0 represents a relative distance to the contour candidate point, Z0 represents a relative distance to the distance reference point, yc0 represents the height of the contour candidate point in the image taken by the camera, and y0 represents the height of the distance reference point in the image taken by the camera.

When the contour candidate point (xc0, yc0) of FIG. 6 belongs to the vehicle, the contour candidate point is projected onto a point corresponding to the height Yc0 on the Z-axis distance Z0 of the distance reference point as illustrated in the right bottom graph of FIG. 6, and the height may be expressed as Equation 7.

$$Yc0 = h\left(1 - \frac{yc0}{y0}\right) \quad \text{[Equation 7]}$$

In Equation 7, Yc0 represents the height of the contour candidate point, yc0 represents the height of the contour candidate point in the image taken by the camera, and y0 represents the height of the distance reference point in the image taken by the camera.

When the subtraction result of Equation 6 over time is constant within a predetermined error range, the corresponding contour candidate point may be determined to be an object on the road. In this case, it may be considered that the extracted contour candidate point does not belong to the vehicle. Furthermore, when the height of Equation 7 over time is constant within a predetermined error range, the corresponding contour candidate point may be determined to be a portion of the vehicle. In this case, it may be considered that the extracted contour candidate point belongs to the vehicle.

Referring back to FIG. 4, step ST130 of determining whether the contour candidate point belongs to the vehicle begins with step ST131 of extracting the distance reference point.

The first relative distance tracking process is performed as follows. The contour point determination unit 220 subtracts the relative distance to the distance reference point from the relative distance to the contour candidate point through Equation 6 at 't=0' at step ST132, and performs the same subtraction through Equation 6 at 't=1' after a predetermined time at step ST134. Then, the contour point determination unit 220 determines whether the subtraction result at 't=0' and the subtraction result at 't=1' are equal to each other within a predetermined error range, at step ST136. When the subtraction result at 't=0' and the subtraction result at 't=1' are equal to each other, the procedure returns to the step ST110 to extract a new contour candidate point. On the other hand, when the subtraction result at 't=0' and the subtraction result at 't=1' are not equal to each other, the contour point determination unit 220 sets the corresponding contour candidate point to a vehicle contour point at step ST140.

The second height tracking process is performed as follows. The contour point determination unit 220 calculates the height of the contour candidate point relative to the distance reference point through Equation 7 at 't=0' at step ST133, and performs the same height calculation through Equation 7 at 't=1' after a predetermined time at step ST135. Then, the contour point determination unit 220 determines whether the calculation result at 't=0' and the calculation result at 't=1' are equal to each other within a predetermined error range, at step ST136.

When the calculation result at 't=0' and the calculation result at 't=1' are not equal to each other, the contour point determination unit 220 sets the corresponding contour candidate point to a vehicle contour point at step ST140. On the other hand, when the calculation result at 't=0' and the calculation result at 't=1' are not equal to each other, the procedure returns to the step ST110 to extract a new contour candidate point.

Next, the contour point variation calculation unit 250 calculates a width variation between the vehicle contour points at the same height among the vehicle contour points as illustrated in FIG. 3, at step ST150. Then, the vanishing point correction unit 260 calculates a variation of the vanishing point using the width variation between the vehicle contour points at step ST160. Hereafter, times t1 and t2 in the following descriptions for the process of calculating the vanishing point variation indicate passages of time.

When the position of the vanishing point at time t1 is represented by $y_{m1}$, the relative distance to the forward vehicle 510 may be acquired through Equation 8 below, as described with reference to Equation 4 above. In Equation 4, since the distance reference point has been obtained based on the bottom of the forward vehicle 510, the height of the coordinate axis relative to the ground surface may be set to '0' ('Y=0'). In the present embodiment, the vehicle contour point is extracted from the contour line of the forward vehicle 510, unlike the conventional method for acquiring a distance reference point. Therefore, the height Y of the vehicle contour point on the coordinate axis needs to be considered.

$$Z_1 = \lambda \frac{h-Y}{y_1 - y_{m-1}} \qquad \text{[Equation 8]}$$

In Equation 8, $Z_1$ represents the relative distance to the forward vehicle at time t1, Y represents the height of the vehicle contour point on the coordinate axis, $y_1$ represents the height of the vehicle contour point in the image taken by the camera at time t1, and $y_{m1}$ represents the height of the vanishing point at time t1.

When the position of the vanishing point at time t2 after a predetermined time is varied to $y_{m2}$, the relative distance to the forward vehicle may be expressed as Equation 9 below.

$$Z_2 = \lambda \frac{h-Y}{y_2 - y_{m2}} \qquad \text{[Equation 9]}$$

In Equation 9, $Z_2$ represents the relative distance to the forward vehicle at time t2, Y represents the height of the vehicle contour point on the coordinate axis, $y_2$ represents the height of the vehicle contour point in an image taken by the camera at time t2, and $y_{m2}$ represents the height of the vanishing point at time t2.

In the conventional method, however, the variation $y_{m2}$ of the vanishing point is not recognized, and the vanishing point information $y_{m1}$ at time t1 is used to calculate the relative distance $Z_2$ at time t2. Therefore, a false warning may be caused. The present invention provides a method of calculating the variation $y_{m2}$ of the vanishing point using the width variation between the vehicle vanishing points with reference to Equation 5 above.

Referring to Equation 5, the denominator of the right side in Equation 8 may be expressed as Equation 10 below.

$$y_1 - y_{m1} = \frac{\lambda}{Z_1}(h-Y) = \frac{w_1}{W}(h-Y) \qquad \text{[Equation 10]}$$

In Equation 10, $w_1$ represents a width between the vehicle contour points at time t1.

Furthermore, the denominator of the right side in Equation 9 may also be expressed as Equation 11 below.

$$y_2 - y_{m2} = \frac{\lambda}{Z_2}(h-Y) = \frac{w_2}{W}(h-Y) \qquad \text{[Equation 11]}$$

In Equation 11, w2 represents a width between the vehicle contour points at time t2.

In Equations 10 and 11, the width W of the forward vehicle on the coordinate axis, the height h of the camera, and the height Y of the vehicle contour point on the coordinate axis are all constants. Therefore, a proportional expression of Equations 10 and 11 may be expressed as Equation 12 below.

$$\frac{y_2 - y_{m2}}{y_1 - y_{m1}} = \frac{w_2}{w_1} \qquad \text{[Equation 12]}$$

Now, the width variation between the vehicle contour points on the camera may be used to obtain a y-axis variation of the vanishing point through Equation 13 below.

$$y_{m2} = y_2 - \frac{w_2}{w_1}(y_1 - y_{m1})  \quad \text{[Equation 13]}$$

That is, the vanishing point correction apparatus and method can calculate the vanishing point variation by measuring the width variation between the vehicle contour points extracted from the image, and correct the position of the vanishing point using the vanishing point variation, thereby reducing a false warning which may occur when a vanishing point variation is not recognized by an ADAS such as FCWS.

While various embodiments have been described above, it will be understood to those skilled in the art that the embodiments described are by way of example only. Accordingly, the disclosure described herein should not be limited based on the described embodiments.

What is claimed is:

1. A vanishing point correction method that corrects the position of a vanishing point in an image taken by a camera in an image recognition system mounted in a vehicle, the vanishing point correction method comprising the steps of:
   (a) extracting a contour candidate point of an object considered as the forward vehicle from the image taken by the camera;
   (b) tracking a movement of the contour candidate point over time;
   (c) determining whether the contour candidate point belongs to the vehicle;
   (d) setting the contour candidate point to a vehicle contour point of the forward vehicle, when it is determined at the step (c) that the contour candidate point belongs to the vehicle;
   (e) calculating a variation in width between vehicle contour points at the same height among the vehicle contour points; and
   (f) calculating a variation of the vanishing point through Equation 13 below:

$$y_{m2} = y_2 - \frac{w_2}{w_1}(y_1 - y_{m1}), \quad \text{Equation 13}$$

where $y_1$ and $y_2$ represent heights of the vehicle contour point in images taken by the camera at times t1 and t2, $w_1$ and $w_2$ represent the widths between the vehicle contour points at times t1 and t2, $y_{m1}$ and $y_{m2}$ represent the heights of the vanishing point at times t1 and t2, and the time t2 indicates a predetermined passage of time from the time t1.

2. The vanishing point correction method of claim 1, wherein the step (a) comprises extracting a point at which a horizontal edge and a vertical edges cross each other in the image taken by the camera, as the contour candidate point.

3. The vanishing point correction method of claim 1, wherein the step (b) comprises the steps of:
   (b-1) defining a first block having a plurality of pixels around the contour candidate point in a first image;
   (b-2) defining a second block having the same size as the first block in a second image after a predetermined passage of time from the first image;
   (b-3) determining whether a pixel value of the second block coincides with a pixel value of the first block, while moving the second block to around the contour candidate point based on the same position as the first block in the second image; and
   (b-4) determining that the contour candidate point has moved in the corresponding block, when it is determined at the step (b-3) that the pixel value of the second block coincides with the pixel value of the first block.

4. The vanishing point correction method of claim 1, wherein the step (c) comprises the steps of:
   (c-1) extracting the bottom of a rear wheel or the end of a lower shadow area of the forward vehicle, and recognizing the bottom of the rear wheel or the end of the lower shadow area as a distance reference point;
   (c-2) subtracting a relative distance to the distance reference point from a relative distance to the contour candidate point through Equation 6 below;
   (c-3) determining whether the subtraction result of the step (c-2) is constant over time within a predetermined error range; and
   (c-4) determining that the corresponding contour candidate point belongs to the vehicle, when it is determined at the step (c-2) that the subtraction result of the step (c-2) is not constant over time:

$$Zc0 - Z0 = \lambda \frac{h}{yc0} - \lambda \frac{h}{y0}, \quad \text{Equation 6}$$

where Zc0 represents the relative distance to the contour candidate point, Z0 represents the relative distance to the distance reference point, yc0 represents the height of the contour candidate point in the image taken by the camera, and y0 represents the height of the distance reference point in the image taken by the camera.

5. The vanishing point correction method of claim 1, wherein the step (c) comprises the steps of:
   (c-1) extracting the bottom of a rear wheel or the end of a lower shadow area of the forward vehicle, and recognizing the bottom of the rear wheel or the end of the lower shadow area as a distance reference point;
   (c-2) calculating a height of the contour candidate point relative to the distance reference point through Equation 7 below;
   (c-3) determining whether the calculation result of the step (c-2) is constant over time within a predetermined error range; and
   (c-4) determining that the corresponding contour candidate point belongs to the vehicle, when it is determined at the step (c-3) that the calculation result of the step (c-2) is constant over time:

$$Yc0 = h\left(1 - \frac{yc0}{y0}\right), \quad \text{Equation 7}$$

where Yc0 represents the height of the contour candidate point, yc0 represents a height of the contour candidate point in the image taken by the camera, and y0 represents a height of the distance reference point in the image taken by the camera.

6. A vanishing point correction apparatus that is mounted in a vehicle and corrects the position of a vanishing point in an image taken by a camera, the vanishing point correction apparatus comprising:

a contour candidate point extraction unit configured to extract a contour candidate point of an object considered as a forward vehicle from the image taken by the camera;

a contour point determination unit configured to track a movement of the contour candidate point, determine whether the contour candidate point belongs to the vehicle, and set the contour candidate point to a vehicle contour point when the contour candidate point belongs to the vehicle;

a contour point variation calculation unit configured to calculate a variation in width between vehicle contour points at the same height among the vehicle contour points; and a vanishing point correction unit configured to calculate a vanishing point variation from the width variation calculated through the contour point variation calculation unit, using Equation 13 below:

$$y_{m2} = y_2 - \frac{w_2}{w_1}(y_1 - y_{m1}),\qquad \text{Equation 13}$$

where $y_1$ and $y_2$ represent heights of the vehicle contour point in images taken by the camera at times t1 and t2, $w_1$ and $w_2$ represent the widths between the vehicle contour points at times t1 and t2, $y_{m1}$ and $y_{m2}$ represent the heights of the vanishing point at times t1 and t2, and the time t2 indicates a predetermined passage of time from the time t1.

7. The vanishing point correction apparatus of claim 6, wherein the contour candidate point extraction unit extracts a point at which a horizontal edge and a vertical edge cross each other in the image taken by the camera, as the contour candidate point.

8. vanishing point correction apparatus 6, wherein the contour point determination unit comprises a relative distance tracking unit configured to extract the bottom of a rear wheel or the end of a lower shadow area of the forward vehicle, recognize the bottom of the rear wheel or the end of the lower shadow area as a distance reference point, determine whether a result obtained by subtracting a relative distance to the distance reference point from a relative distance to the contour candidate point through Equation 6 below is constant over time, and determine that the corresponding contour candidate point belongs to the vehicle, when the subtraction result is not constant over time:

$$Zc0 - Z0 = \lambda\frac{h}{yc0} - \lambda\frac{h}{y0},\qquad \text{Equation 6}$$

where Zc0 represents the relative distance to the contour candidate point, Z0 represents the relative distance to the distance reference point, yc0 represents a height of the contour candidate point in the image taken by the camera, and y0 represents a height of the distance reference point in the image taken by the camera.

9. The vanishing point correction apparatus of claim 6, wherein the contour point determination unit comprises a height tracking unit configured to extract the bottom of a rear wheel or the end of a lower shadow area of the forward vehicle, recognize the bottom of the rear wheel or the end of the lower shadow area as the distance reference point, determine whether a height of the contour candidate point relative to the distance reference point through Equation 7 below is constant over time, and determine that the contour candidate point belongs to the vehicle, when the height of the contour candidate point is constant over time:

$$Yc0 = h\left(1 - \frac{yc0}{y0}\right),\qquad \text{Equation 7}$$

where Yc0 represents the height of the contour candidate point, yc0 represents the height of the contour candidate point in the image taken by the camera, and y0 represents a height of the distance reference point in the image taken by the camera.

* * * * *